G. H. LANG.
LOCKING ATTACHMENT FOR BOLTS AND NUTS, WHEEL CAPS, AND THE LIKE.
APPLICATION FILED APR. 6, 1915.

1,221,194.

Patented Apr. 3, 1917.

G. H. Lang
Inventor
By Brozdon Marks
Attorney.

UNITED STATES PATENT OFFICE.

GEORGE HENRY LANG, OF AUBURN, VICTORIA, AUSTRALIA.

LOCKING ATTACHMENT FOR BOLTS AND NUTS, WHEEL-CAPS, AND THE LIKE.

1,221,194.  Specification of Letters Patent.  Patented Apr. 3, 1917.

Application filed April 6, 1915. Serial No. 19,572.

*To all whom it may concern:*

Be it known that I, GEORGE HENRY LANG, a subject of the King of Great Britain, residing at 31 Harts Parade, Auburn, in the State of Victoria, Commonwealth of Australia, have invented new and useful Improvements in Improved Locking Attachments for Bolts and Nuts, Wheel-Caps, and the like, of which the following is a specification.

This invention relates to an improved locking attachment for bolts and nuts wheel caps and the like and refers more particularly to a locking attachment for the nuts of screw bolts whereby the same may be screwed home with the desired tension, and security locked in place and prevented from becoming unscrewed and loosened by vibration or otherwise. Though herein described as applied to the nuts of screw bolts it will be understood that it is equally applicable to wheel caps and other like screw elements.

The object of this invention is to provide an attachment of simple and effective construction easily applicable to screw nuts of ordinary construction without diminishing the strength and efficiency of the fastening.

I accomplish this object by forming the screw bolt or male portion of the screw element with one or more longitudinal slots or grooves. These slots or grooves extend down to the bottom of the threads and commence a short distance in from the end of the bolt. The nut or female portion of the screw element is provided with one or more spring catches the points of which are adapted when the said nut or female portion is screwed home to engage the aforesaid longitudinal slots or grooves and securely lock the nut in position. These spring catches comprise flat springs of steel or the like flexible material set into recesses or slots in the nut.

Figure 1:
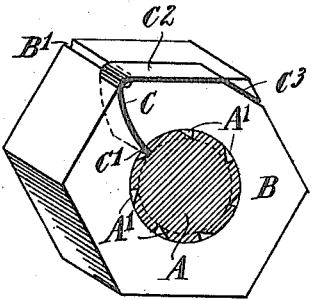
Figure 2:
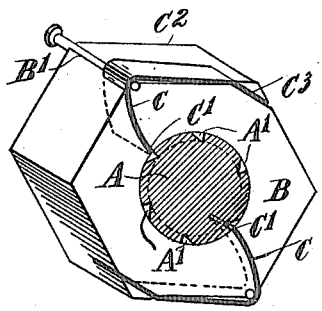

In Figures 1 and 2 of the accompanying drawings the same form or design of spring catch is shown there being only one in Fig. 1, while two are provided in Fig. 2. The bolt A is provided with one or more longitudinal slots or grooves A', which are cut across the thread. These slots or grooves are in this case made ratchet shaped, that is to say with a radial edge and an inclined edge—the radial edge being in such position that the spring catch automatically adapts itself to lock the nut upon the forward movement. The nut B is formed with cuts or recesses upon its face to accommodate spring catches C made of flat spring steel or other like material. These spring catches C are formed with a projecting edge C' adapted to engage the slots or grooves A', a flat or straight portion C² bearing upon the outer face of the nut B or recessed or countersunk to present a flush face, while the other end C³ is bent at an obtuse angle and accommodated in a diagonal cut or recess across an angle of the nut B. The end of the spring catch C is held rigidly while the straight portion C² affords sufficient spring for the projecting front C' to be released from the groove or slot A' the said projecting edge C' being set approximately radially from the end C³ to afford free movement. The nut B is further provided with a slot or recess B' into which a nail or other pointed instrument may be inserted for the purpose of lifting the spring C and thereby releasing the edge C' from the groove A'. If the flat portion C² of the spring C bears on the outer face of the nut B and the latter is not countersunk, the spring may be released by the insertion of the point of a flat sharp instrument such as a screw driver.

Figure 3:
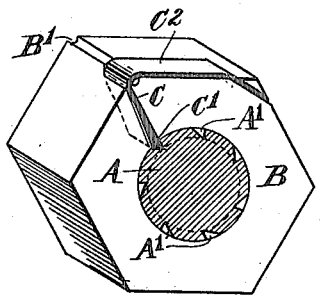
Figure 4:
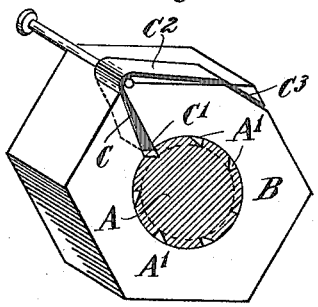

In Figs. 3 and 4 the same design of spring is shown accommodated in the same way in the nut B. The projecting point C' is thickened or reinforced and the recess accommodating the same correspondingly enlarged. This strengthens the said point and at the same time limits the outward movement of the spring (as shown in Fig. 4) so that the same cannot be overstrained in releasing.

Figure 5:
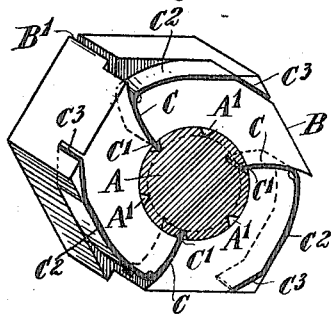

Fig. 5 shows a similar construction, the back portion C² of the spring C being slightly curved and recessed or countersunk into the nut B. The grooves A' in the bolt A are V-shaped that is the walls are inclined upon both sides so that the nut may be turned in either direction by increased pressure the catches being adapted to automatically lock in position.

Figure 6:
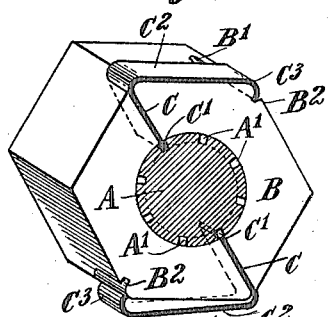

In Fig. 6 another modification is shown in which the grooves A' in the bolt A are formed with parallel sides (instead of ratchet faces.) In this case the spring catch C has to be released for movement of the nut B in either direction. The spring catch C is formed with its flat portion C² adapted to lie upon the face of the nut and the outer end C³ is turned around as shown and adapted to engage a corresponding notch or groove B² in the nut B. In practice this turned in edge C³ is snapped into the notch or groove B² to lock the spring catch in place and for releasing purposes is disengaged first, when the spring may be lifted to disengage the point C', from the groove A', and the nut B thereby released.

Figure 7:
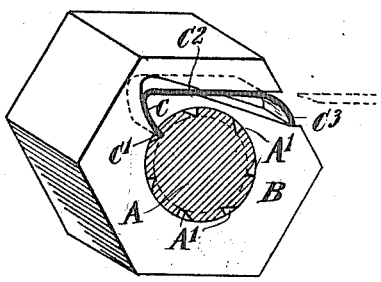

In Fig. 7 the spring C is internally recessed in the nut B the recesses being enlarged to allow of the movement of the spring. The insertion of the point of a wedge shaped instrument (such as a screw driver) bearing upon the flat or straight portion C² of the spring C will cause the projecting point C' to be released out of engagement with the grooves A'.

Figure 8:
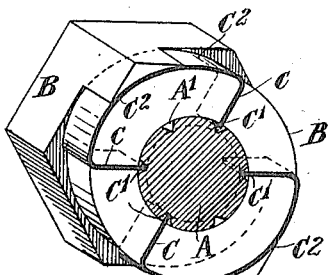

In Fig. 8 multiple engagement of spring catches C with grooves A' is shown the walls of the said grooves being V-shaped. The spring catches C are formed with curved backs and both points C' of the same spring are adapted to engage the grooves A' the nut B being correspondingly recessed to accommodate the shape of the spring C.

I claim:—

1. A locking attachment, for bolt and nut elements, comprising a spring catch of resilient material, the cross section of which is wide in comparison to its thickness, and having one end retained within a recess in the nut element, the other end projecting substantially radially inward toward the bolt element and adapted to engage a longitudinal slot in the latter, and a central portion connecting said ends, the nut member being provided with a longitudinal slot within which means may be inserted to raise the spring catch.

2. A locking attachment, for bolt and nut elements, comprising a spring catch of flat resilient material having one end retained within a recess extending across one corner of the nut element, the other end projecting substantially radially inward toward the bolt element and adapted to engage a longitudinal slot in the latter, and a central portion connecting said ends.

3. A locking attachment, for bolt and nut elements, comprising a spring catch of flat resilient material having one end retained within a recess extending across one corner of the nut element, the other end projecting substantially radially inward toward the bolt element and adapted to engage a longitudinal slot in the latter, and a central slightly curved portion connecting said ends and located in a recess extending inward from the circumferential surface of the nut element.

In testimony whereof I have signed my name to this specification in the presence of two subscribing witnesses.

GEORGE HENRY LANG.

Witnesses:
CLEM A. HACK,
G. R. CULLEN.